(12) United States Patent
Quan

(10) Patent No.: US 9,860,372 B2
(45) Date of Patent: Jan. 2, 2018

(54) DEVICE AND METHOD FOR DISPLAYING INFORMATION RELEVANT TO UNKNOWN INCOMING/OUTGOING PHONE NUMBER

(71) Applicants: Beijing Qihoo Technology Company Limited, Beijing (CN); Qizhi Software (Beijing) Company Limited, Beijing (CN)

(72) Inventor: Xiaozhou Quan, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/034,150

(22) PCT Filed: Jul. 29, 2014

(86) PCT No.: PCT/CN2014/083226
§ 371 (c)(1),
(2) Date: May 3, 2016

(87) PCT Pub. No.: WO2015/062321
PCT Pub. Date: May 7, 2015

(65) Prior Publication Data
US 2016/0286039 A1 Sep. 29, 2016

(30) Foreign Application Priority Data
Nov. 4, 2013 (CN) .......................... 2013 1 0538368

(51) Int. Cl.
*H04M 3/42* (2006.01)
*H04W 4/16* (2009.01)
(Continued)

(52) U.S. Cl.
CPC ......... *H04M 3/42042* (2013.01); *H04M 1/56* (2013.01); *H04M 1/575* (2013.01); *H04W 4/16* (2013.01); *H04M 2201/18* (2013.01)

(58) Field of Classification Search
CPC ............. H04M 3/42059; H04M 3/436; H04M 1/274533; H04M 1/72583;
(Continued)

(56) References Cited

U.S. PATENT DOCUMENTS

| 2007/0150097 A1 | 6/2007 | Chae et al. |
| 2011/0035220 A1* | 2/2011 | Opaluch ............... G10L 15/265 704/246 |
| 2013/0290229 A1* | 10/2013 | Tsukamoto ............. G06F 21/32 706/12 |

FOREIGN PATENT DOCUMENTS

| CN | 101227685 | 7/2008 |
| CN | 101808086 | 8/2010 |

(Continued)

OTHER PUBLICATIONS

Core Telephony.*

*Primary Examiner* — Nizar Sivji
(74) *Attorney, Agent, or Firm* — Harness, Dickey & Pierce, P.L.C.

(57) ABSTRACT

Disclosed is a device for displaying information relevant to an unknown incoming/outgoing phone number, comprising one or more non-transitory computer readable medium configured to store computer-executable instructions, and at least one processor to execute the instructions to cause: monitoring an incoming/outgoing call event in an IOS system and acquiring an unknown incoming/outgoing phone number, wherein the unknown incoming/outgoing phone number is a number not existing in an address book database of the IOS system, searching for relevant information about the incoming/outgoing phone number in a number-relevant information database and generating contact information according to the found information relevant to the number, and adding the generated contact information into the address book database, so that the information relevant to
(Continued)

the unknown incoming/outgoing phone number is displayed on an incoming/outgoing calling interface. Related methods are also disclosed.

13 Claims, 4 Drawing Sheets

(51) Int. Cl.
  *H04M 1/56* (2006.01)
  *H04M 1/57* (2006.01)
(58) Field of Classification Search
  CPC ..... H04M 2203/2072; H04M 2250/60; H04M 3/465; H04M 3/42068; H04M 3/42042; H04M 1/56; H04W 12/06; H04L 29/1216; H04L 61/1547; H04L 61/157
  See application file for complete search history.

(56) References Cited

FOREIGN PATENT DOCUMENTS

| | | | |
|---|---|---|---|
| CN | 101808086 A | * | 8/2010 |
| CN | 102761842 | | 10/2012 |
| CN | 103052044 | | 4/2013 |
| CN | 103179552 | | 6/2013 |
| CN | 103220391 | | 7/2013 |
| CN | 103607498 | | 2/2014 |

* cited by examiner

DEVICE AND METHOD FOR DISPLAYING INFORMATION RELEVANT TO UNKNOWN INCOMING/OUTGOING PHONE NUMBER

TECHNICAL FIELD

The present invention relates to the field of communication, particularly to device and a method for displaying information relevant to an unknown incoming/outgoing phone number.

DESCRIPTION OF RELATED ART

A mobile phone device which adopts the IOS operating system, when displaying information relevant to an unknown incoming/outgoing phone number, needs to display the information by popping up a system mode dialog box on an incoming/outgoing calling interface. For example, when displaying information relevant to the unknown incoming/outgoing phone number, an iPhone displays the information by popping up a system mode dialog box on an incoming/outgoing calling interface.

However, when the system mode dialog box is popped up on the incoming/outgoing calling interface, operation on call function by a user will be blocked by the mode dialog box, which disturbs further use of the call function by the user; for example, the user cannot select the hands-free mode in time and can perform operation on the call function only after closing the mode dialog box.

With respect to the above drawback, the user can only overcome the problem of popping up the system mode dialog box when displaying information relevant to the unknown incoming/outgoing phone number, through the iPhone jailbreak. There is no technical solution disclosed in the prior art, in which the information relevant to the unknown incoming/outgoing phone number will be displayed on a non-jailbreak iPhone without influencing the use of call function by the user.

BRIEF SUMMARY OF THE INVENTION

In view of the above problem, the present invention is proposed to provide a device for displaying information relevant to an unknown incoming/outgoing phone number and a corresponding method for displaying information relevant to an unknown incoming/outgoing phone number, so as to overcome the above problem or at least partially solve the above problem.

In accordance with an aspect of the present invention, a method for displaying information relevant to an unknown incoming/outgoing phone number is provided, the method comprising:

monitoring an incoming/outgoing call event in an IOS system and acquiring an unknown incoming/outgoing phone number, wherein the unknown incoming/outgoing phone number is a number not existing in the address book database of the IOS system;

searching for relevant information about the incoming/outgoing phone number in a number-relevant information database and generating contact information according to the found information relevant to the number; and adding the generated contact information into the address book database, so that the information relevant to the unknown incoming/outgoing phone number is displayed on an incoming/outgoing calling interface.

In accordance with another aspect of the present invention, a device for displaying information relevant to an unknown incoming/outgoing phone number is provided, the device comprising:

an acquisition unit, configured to monitor an incoming/outgoing call event in an IOS system and acquire an unknown incoming/outgoing phone number, wherein the unknown incoming/outgoing phone number is a number not existing in the address book database of the IOS system;

a generating unit, configured to search for relevant information about the incoming/outgoing phone number in a number-relevant information database and generate contact information according to the found information relevant to the number; and an adding unit, configured to add the generated contact information into the address book database, so that the information relevant to the unknown incoming/outgoing phone number is displayed on an incoming/outgoing calling interface.

In accordance with still another aspect of the present invention, a computer program is provided, comprising computer readable codes which, when running on a client device, cause the client device to perform the method of an aspect of the present invention.

In accordance with yet another aspect of the present invention, a computer readable medium is provided, in which the computer program according to the other aspect of the present invention is stored.

In the method and the device for displaying information relevant to an unknown incoming/outgoing phone number provided according to the present invention, by generating contact information from the information relevant to the unknown incoming/outgoing phone number and storing the contact information in the address book database, the information relevant to the unknown incoming/outgoing phone number can be displayed as information relevant to an incoming/outgoing phone number in the address book database on the incoming/outgoing calling interface, and when information relevant to an incoming/outgoing phone number in the address book database is displayed on the incoming/outgoing calling interface, continued use of the call function by the user will not be influenced, thereby the problem that a non-jailbreak IOS system affects the use of a call function of a user when displaying the information relevant to an unknown incoming/outgoing phone number is solved, so that the user experience is smoother.

The above explanation is merely an outline of the technical solution of the present invention. In order to be able to understand the technical means of the present invention more clearly and to be able to implement it in accordance with the contents of the specification, and in order to enable the above and other objects, features and advantages of the present invention more evident and comprehensible, the specific embodiments of the present invention are particularly described in the following.

BRIEF DESCRIPTION OF THE SEVERAL VIEWS OF THE DRAWINGS

By reading the following detailed description of the preferred embodiments, various other advantage and benefits will be clear for those ordinary skilled in the art. The drawings are merely used for purpose of illustration of the preferred embodiments and are not considered as limiting of the present invention. Further, the same components will be denoted by the same reference symbol throughout the drawings. In the drawings.

DETAILED DESCRIPTION OF THE INVENTION

The present invention will be further described below in connection with the drawings and specific embodiments.

Figure 1:
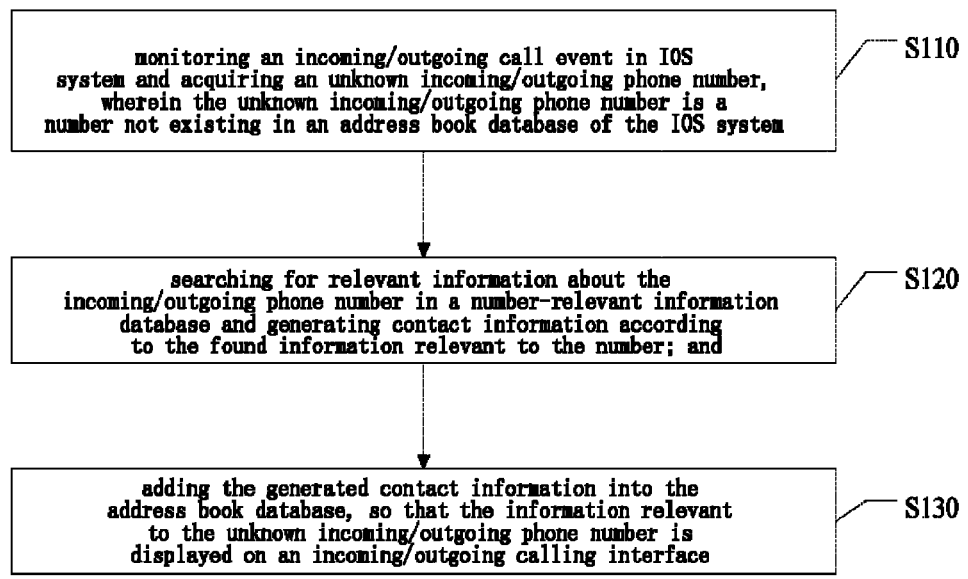
FIG. 1 shows a flowchart of a method for displaying information relevant to an unknown incoming/outgoing phone number according to an embodiment of the present invention.

FIG. 1 shows a flowchart of a method for displaying information relevant to an unknown incoming/outgoing phone number according to an embodiment of the present invention. As shown in FIG. 1, the method comprises:

S110: monitoring an incoming/outgoing call event in an IOS system and acquiring an unknown incoming/outgoing phone number, wherein the unknown incoming/outgoing phone number is a number not existing in the address book database of the IOS system;

S120: searching for relevant information about the incoming/outgoing phone number in a number-relevant information database and generating contact information according to the found information relevant to the number; and S130: adding the generated contact information into the address book database, so that the information relevant to the unknown incoming/outgoing phone number is displayed on an incoming/outgoing calling interface.

Wherein, in all the embodiments of the present invention, "/" represents the relationship of "or".

In an embodiment of the present invention, the number-relevant information database comprises an attribution location database and/or a marking information database; and the information relevant to an unknown incoming/outgoing phone number comprises number attribution location information and/or number marking information, wherein the number attribution location information is information on a city where the number is located; the marking information is marking information on whether the number is used for advertising, agency, selling and so on.

In an embodiment of the present invention, searching for relevant information about the incoming/outgoing phone number in a number-relevant information database comprises: searching for the information relevant to the incoming/outgoing phone number in the local number-relevant information database, the local number-relevant information database being downloaded from the cloud; or searching for the information relevant to the incoming/outgoing phone number in a number-relevant information database in the cloud.

In an embodiment of the present invention, generating contact information according to the found information relevant to the number comprises: using the found number attribution location information as a contact person name; and/or using the found number marking information as a contact person label.

In an embodiment of the present invention, the method further comprises: triggering by a timer to delete the contact information from the address book database when the contact information is added into the address book database; or deleting the contact information from the address book database when the incoming/outgoing call is answered or hung up, wherein after the contact information is deleted, the information relevant to the incoming/outgoing phone number will not disappear on a call waiting interface or a call operating interface.

In an embodiment of the present invention, monitoring an incoming/outgoing call event in an IOS system comprises: monitoring the incoming/outgoing call event in the IOS system through a CTTelephonyCenterAddObserver application interface.

Figure 2:
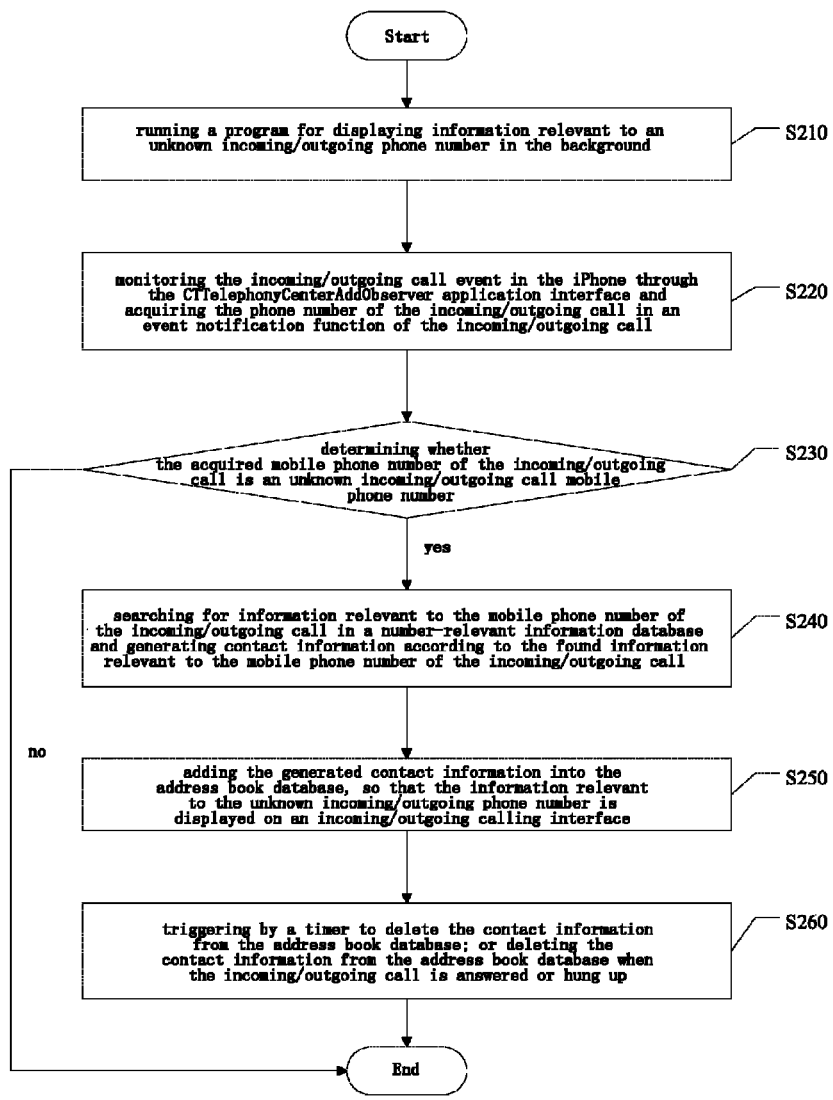
FIG. 2 shows a detailed flowchart of a method for displaying information relevant to an unknown incoming/outgoing phone number according to an embodiment of the present invention.

In accordance with the above description, exemplifying an iPhone, FIG. 2 shows a detailed flowchart of a method for displaying information relevant to an unknown incoming/outgoing phone number according to an embodiment of the present invention, the specific operations of which are as follows:

S210: running a program for displaying information relevant to an unknown incoming/outgoing phone number in the background;

Wherein in the iPhone, the running of the program for displaying information relevant to an unknown incoming/outgoing phone number in the background is realized though an audio player interface or a network phone interface and the like of the iPhone.

S220: monitoring the incoming/outgoing call event in the iPhone through the CTTelephonyCenterAddObserver application interface and acquiring the phone number of the incoming/outgoing call in an event notification function of the incoming/outgoing call;

Wherein the event notification function of the incoming/outgoing call is defined by the CTTelephonyCenterAddObserver application interface.

S230: determining whether the acquired mobile phone number of the incoming/outgoing call is an unknown incoming/outgoing call mobile phone number, if so, then performing a step S240 and if not, then ending;

The mobile phone number of the unknown incoming/outgoing call means a number not existing in the address book database of the iPhone, and the address book database of the iPhone is provided by the iPhone system itself, and can be operated by adding, deleting and editing through an application interface.

S240: searching for information relevant to the mobile phone number of the incoming/outgoing call in a number-relevant information database and generating contact information according to the found information relevant to the mobile phone number of the incoming/outgoing call;

Wherein, the number-relevant information database comprises: an attribution location database and/or a marking information database and other information relating to this number; the information relevant to the unknown incoming/outgoing phone number comprises: number attribution location information and/or number marking information and other information relating to this number.

When generating the contact information, if only the number attribution location information of the incoming/outgoing phone number is found in the number-relevant information database, then the contact information is generated by using the number attribution location information as a contact person name; if only the marking information of the incoming/outgoing phone number is found in the number-relevant information database, then the contact information is generated by using the marking information of the number as a contact person label; if both the number attribution location information and the marking information of the incoming/outgoing phone number are found in the number-relevant information database, then the contact information is generated by using the found number attribution location information as the contact person name and using the found marking information of the number as the contact person label.

S250: adding the generated contact information into the address book database, so that the information relevant to the unknown incoming/outgoing phone number is displayed on an incoming/outgoing calling interface;

S260: triggering by a timer to delete the contact information from the address book database; or deleting the contact information from the address book database when the incoming/outgoing call is answered or hung up.

Wherein after the contact information is deleted, the information relevant to the incoming/outgoing phone number will not disappear on a call waiting interface or a call operating interface.

Figure 3:
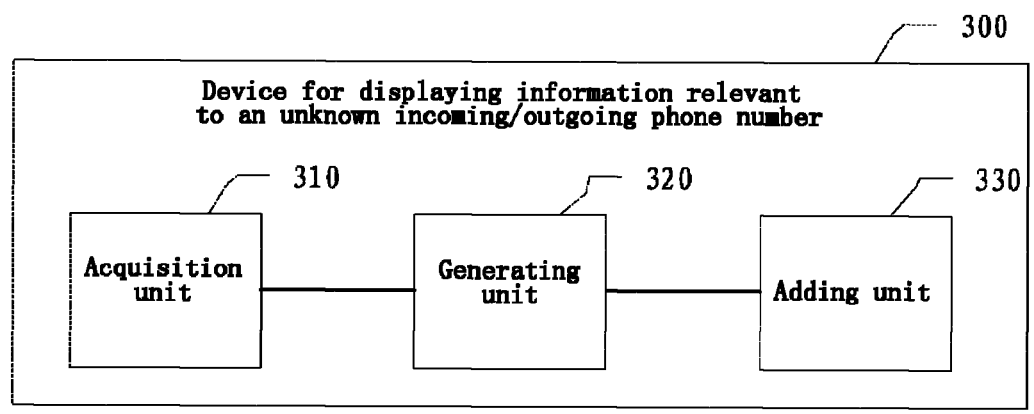
FIG. 3 shows a structure diagram of a device for displaying information relevant to an unknown incoming/outgoing phone number according to an embodiment of the present invention.

FIG. 3 shows a structure diagram of a device for displaying information relevant to an unknown incoming/outgoing phone number according to an embodiment of the present invention. The device 300 comprises:

an acquisition unit 310, configured to monitor an incoming/outgoing call event in an IOS system and acquire an unknown incoming/outgoing phone number, wherein the unknown incoming/outgoing phone number is a number not existing in the address book database of the IOS system;

a generating unit 320, configured to search for relevant information about the incoming/outgoing phone number in a number-relevant information database and generate contact information according to the found information relevant to the number;

an adding unit 330, configured to add the generated contact information into the address book database, so that the information relevant to the unknown incoming/outgoing phone number is displayed on an incoming/outgoing calling interface.

In an embodiment of the present invention, the number-relevant information database comprises: an attribution location database and/or a marking information database; the information relevant to the unknown incoming/outgoing phone number comprises: number attribution location information and/or number marking information.

In an embodiment of the present invention, the generating unit is configured to search for the information relevant to the incoming/outgoing phone number in the local number-relevant information database, the local number-relevant information database being downloaded from the cloud; or the generating unit is configured to search for the information relevant to the incoming/outgoing phone number in a number-relevant information database in the cloud.

In an embodiment of the present invention, the generating unit is configured to use the found number attribution location information as a contact person name, and/or use the found number marking information as a contact person label.

Figure 4:
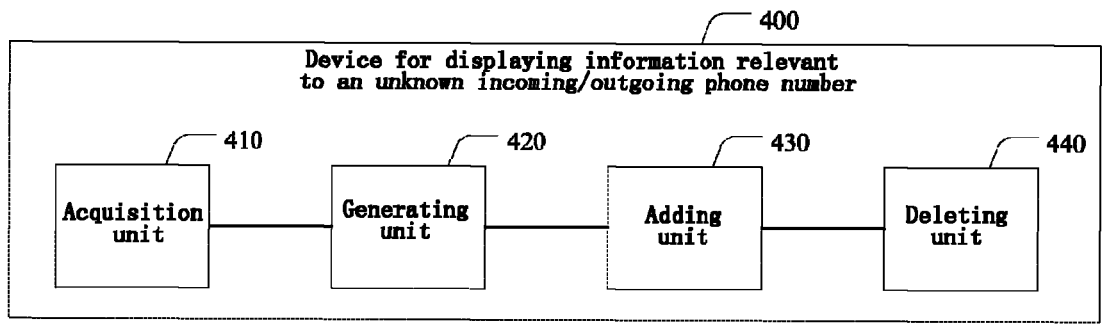
FIG. 4 shows another structure diagram of a device for displaying information relevant to an unknown incoming/outgoing phone number according to an embodiment of the present invention.

FIG. 4 shows another structure diagram of a device for displaying information relevant to an unknown incoming/outgoing phone number according to an embodiment of the present invention. The device 400 comprises:

an acquisition unit 410, a generating unit 420, an adding unit 430 and a deleting unit 440, wherein the function of the acquisition unit 410 is the same as the function of the acquisition unit 310 in FIG. 3, the function of the generating unit 420 is the same as the function of the generating unit 320 in FIG. 3, and the function of the adding unit 430 is the same as the function of the adding unit 330 in FIG. 3, the description of which will not be repeated here.

The deleting unit 440 is configured to trigger by a timer to delete the contact information from the address book database when the contact information is added into the address book database, and configured to delete the contact information from the address book database when the incoming/outgoing call is answered or hung up.

In an embodiment of the present invention, the acquisition unit monitors the incoming/outgoing call event in the IOS system through a CTTelephonyCenterAddObserver application interface.

The method and device for displaying information relevant to an unknown incoming/outgoing phone number provided according to the present invention have the following beneficial effects:

(1) by generating contact information from the information relevant to the unknown incoming/outgoing phone number and storing the contact information in the address book database, the information relevant to the unknown incoming/outgoing phone number can be displayed as information relevant to an incoming/outgoing phone number in the address book database on the incoming/outgoing calling interface, and when information relevant to an incoming/outgoing phone number in the address book database is displayed on the incoming/outgoing calling interface, continued use of the call function by the user will not be influenced, thereby the problem that a non-jailbreak IOS system affects the use of a call function of a user when displaying the information relevant to an unknown incoming/outgoing phone number is solved, so that the user experience is smoother.

(2) In a case that the mobile phone is in the locked screen interface, when an unknown incoming call is answered, the call operating interface is still run in the foreground, which facilitates operations of the call operating interface by the user, and the call can be directly hung up, which facilitates user operations.

It shall be noted that:

The respective components of the embodiments of the present invention can be implemented in hardware, or implemented in a software module running on one or more processor, or implemented in combination thereof. It should be understood by those skilled in the art, that in practice a microprocessor or a digital signal processor (DSP) can be used to implement some or all functions of some or all components in a screen capturing device according to the embodiments of the present invention. The present invention can also be implemented as a device or device program (e.g., a computer program and a computer program product) for executing some of all of the method described here. Such a program for implementing the present invention can be stored on a computer readable medium or can have a form of one or more signal. Such a signal can be downloaded from an Internet website or provided on a carrier signal or provided in any other form.

Figure 5:
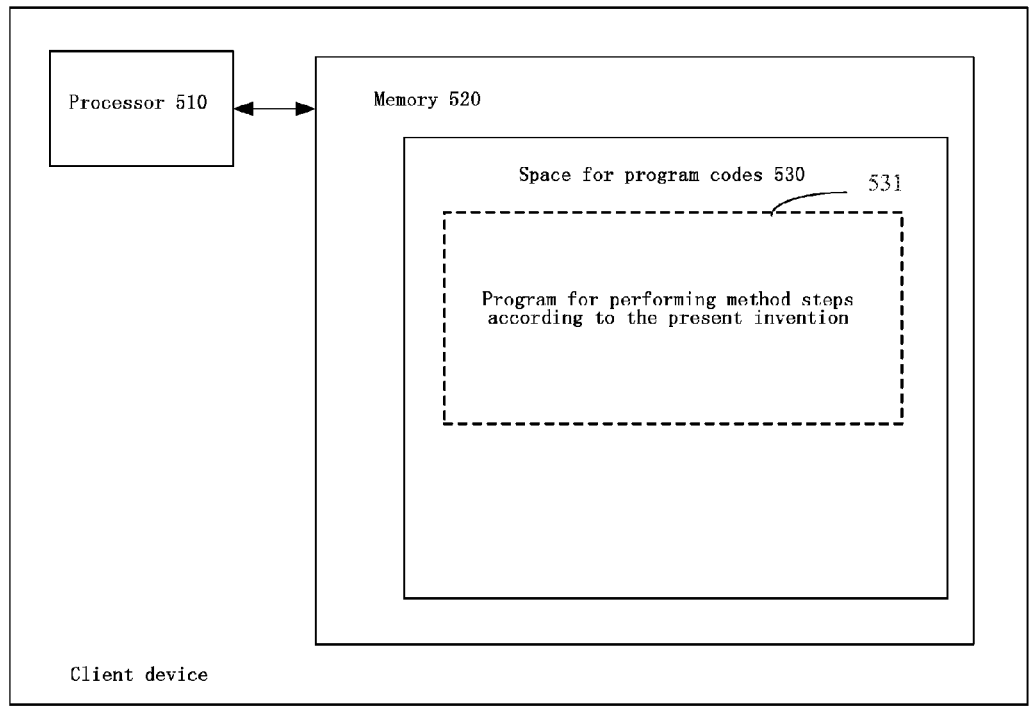
FIG. 5 schematically shows a block diagram of a client device for performing the method for displaying information relevant to an unknown incoming/outgoing phone number according to the present invention.
Figure 6:
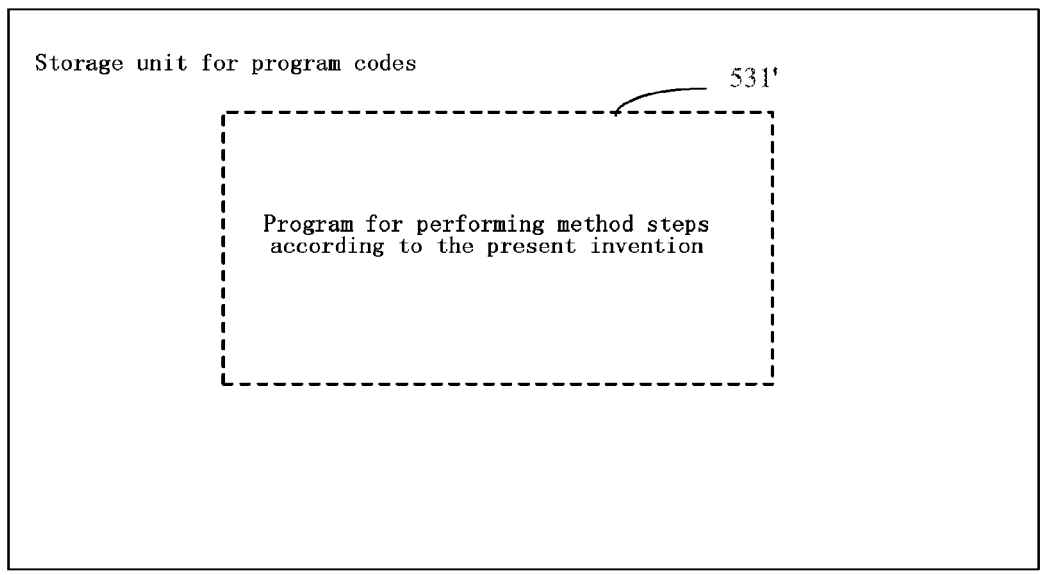
FIG. 6 schematically shows a storage unit for holding or carrying program codes for realizing the method for displaying information relevant to an unknown incoming/outgoing phone number according to the present invention.

For example, FIG. 5 schematically shows a client device for performing the method for displaying information relevant to an unknown incoming/outgoing phone number according to the present invention;

The client device traditionally comprises a processor 510 and a computer program product or a computer readable medium in a form of a memory 520. The memory 520 can be an electronic memory such as a flash memory, an EEPROM (Electrically Erasable Programmable Read Only Memory), an EPROM, a hard disk or a ROM or the like. The memory 520 has a storage space 530 for program codes 531 for executing any method steps in the above method. For example, the storage space 530 for the program codes can include the respective program codes 531 for respectively implementing various steps in the above method. These program codes can be read out from or written into one or more computer program products. These computer program products include program code carriers such as a hard disk, a compact disk (CD), a memory card or a floppy disk. Such computer program products are generally portable or fixed storage units as described with reference to FIG. 6. FIG. 6 schematically shows a storage unit for holding or carrying program codes for realizing the method for displaying information relevant to an unknown incoming/outgoing phone number according to the present invention; the storage units can have storage sections, storage spaces, etc. arranged similar to those of the memory 520 in the client device of FIG. 5. The program codes can be compressed for example in a suitable format. Generally, the storage units include computer readable codes 531', that is, codes that can be read by a processor for example such as processor 510. When these codes are run by the client device, the client device is caused to execute respective steps in the above described method.

"One embodiment", "an embodiment" or "one or more embodiment" referred to as in the specification means, that a specific feature, structure or characteristic described in connection with the embodiments is included in at least one embodiment of the present invention. Moreover, it should be noted that, a word example of "in one embodiment" here does not necessarily all refer to the same embodiment.

In the specification provided here, a number of specific details are explained. However, it should be understood that, the embodiments of the present invention can be practiced without these specific details. In some embodiments, a method, structure and technology known well have not been illustrated in detail, so as not to obscure the understanding of the specification.

It should be noted that, the above described embodiments are used for explaining the present invention, rather than limiting the present invention, and an alternative embodiment can be designed by those skilled in the art without departing from the scope of the appended claims. In the claims, any reference symbol positioned between parentheses should not be considered the limiting of the claims. The word "include" does not exclude the existence of a element or a step that is not described in the claims. The word "a" or "an" positioned before an element does not exclude the existence of a plurality of such element. The present invention can be implemented by way of a hardware comprising several different elements and by way of a computer suitably programmed. In a unit claim enumerating several devices, several of these devices can be specifically implemented by the same hardware. The use of the word "first", "second" and "third", etc. does not represent any sequence. These words can be construed as a name.

Furthermore, it also should be noted that, the expressions used in the specification are principally selected for the purpose of readability and teaching, are not selected for interpreting or limiting the subject of the present invention. Therefore, many modifications and alteration are all obvious for those ordinary skilled in the art, without departing from the scope and spirit of the appended claims. For the scope of the present invention, the disclosure of the present invention is illustrative, not limiting and the scope of the present invention is limited by the appended claims.

The invention claimed is:

1. A device for displaying information relevant to an unknown incoming/outgoing phone number, the device comprising one or more non-transitory computer readable medium configured to store computer-executable instructions and at least one processor to execute the instructions to cause:
   monitoring an incoming/outgoing call event in an iPhone operating system (IOS) and acquiring an unknown incoming/outgoing phone number, wherein the unknown incoming/outgoing phone number is a number not existing in an address book database of the IOS;
   searching for relevant information about the incoming/outgoing phone number in a number-relevant information database and generating contact information according to the found information relevant to the number; and
   adding the generated contact information into the address book database of the IOS, and displaying the information relevant to the unknown incoming/outgoing phone number on an incoming/outgoing calling interface according to the address book database of the IOS.

2. The device according to claim 1, wherein the number-relevant information database comprises an attribution location database and/or a marking information database; and
   the information relevant to an unknown incoming/outgoing phone number comprises number attribution location information and/or number marking information.

3. The device according to claim 2, wherein searching for the relevant information comprises:
   searching for the information relevant to the incoming/outgoing phone number in a local number-relevant information database, the local number-relevant information database being downloaded from a cloud; or
   searching for the information relevant to the incoming/outgoing phone number in a number-relevant information database in a cloud.

4. The device according to claim 2, wherein generating the contact information comprises:
   using the found number attribution location information as a contact person name, and/or using the found number marking information as a contact person label.

5. The device according to claim 1, wherein the processor further executes the instructions to cause:
   triggering by a timer to delete the contact information from the address book database when the contact information is added into the address book database, or deleting the contact information from the address book database when the incoming/outgoing call is answered or hung up.

6. The device according to claim 1, wherein monitoring the incoming/outgoing call event in the IOS comprises:
   monitoring the incoming/outgoing call event in the IOS through an application interface.

7. A non-transitory computer readable medium having instructions stored thereon that, when executed by at least one processor, cause the at least one processor to perform operations for displaying information relevant to an unknown incoming/outgoing phone number, which comprises the steps of:

monitoring an incoming/outgoing call event in an IOS and acquiring an unknown incoming/outgoing phone number, wherein the unknown incoming/outgoing phone number is a number not existing in an address book database of the IOS;

searching for relevant information about the incoming/outgoing phone number in a number-relevant information database and generating contact information according to the found information relevant to the number; and adding the generated contact information into the address book database of the IOS, and displaying the information relevant to the unknown incoming/outgoing phone number on an incoming/outgoing calling interface according to the address book database of the IOS.

8. A method for displaying information relevant to an unknown incoming/outgoing phone number, the method comprising:

monitoring an incoming/outgoing call event in an IOS and acquiring an unknown incoming/outgoing phone number, wherein the unknown incoming/outgoing phone number is a number not existing in an address book database of the IOS;

searching for relevant information about the incoming/outgoing phone number in a number-relevant information database and generating contact information according to the found information relevant to the number; and adding the generated contact information into the address book database of the IOS, and displaying the information relevant to the unknown incoming/outgoing phone number on an incoming/outgoing calling interface according to the address book database of the IOS.

9. The method according to claim 8, wherein:

the number-relevant information database comprises an attribution location database and/or a marking information database; and the information relevant to an unknown incoming/outgoing phone number comprises number attribution location information and/or number marking information.

10. The method according to claim 8, wherein searching for the relevant information comprises:

searching for the information relevant to the incoming/outgoing phone number in the local number-relevant information database, the local number-relevant information database being downloaded from a cloud; or searching for the information relevant to the incoming/outgoing phone number in a number-relevant information database in a cloud.

11. The method according to claim 9, wherein generating the contact information comprises:

using the found number attribution location information as a contact person name; and/or using the found number marking information as a contact person label.

12. The method according to claim 8, wherein the method further comprises:

triggering by a timer to delete the contact information from the address book database when the contact information is added into the address book database; or deleting the contact information from the address book database when the incoming/outgoing call is answered or hung up.

13. The method according to claim 8, wherein monitoring the incoming/outgoing call event in the IOS comprises:

monitoring the incoming/outgoing call event in the IOS through an application interface.

\* \* \* \* \*